(12) United States Patent
Kojima

(10) Patent No.: US 6,719,391 B2
(45) Date of Patent: Apr. 13, 2004

(54) INK JET RECORDING APPARATUS AND INK JET RECORDING METHOD

(75) Inventor: Ryuichi Kojima, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/228,297

(22) Filed: Aug. 27, 2002

(65) Prior Publication Data

US 2003/0043219 A1 Mar. 6, 2003

(30) Foreign Application Priority Data

Aug. 29, 2001 (JP) ..................... P. 2001-259452

(51) Int. Cl.⁷ .................. B41J 29/38; B41J 2/145; B41J 2/15
(52) U.S. Cl. .................. 347/14; 347/12; 347/41; 347/9
(58) Field of Search ................ 347/41, 14, 9, 347/40

(56) References Cited

U.S. PATENT DOCUMENTS 6,375,307 B1 * 4/2002 Vinals et al. .................. 347/41
6,557,973 B1 * 5/2003 Elgee ........................... 347/41

FOREIGN PATENT DOCUMENTS

| JP | 64-26460 | 1/1989 |
| JP | 2-3326 | 1/1990 |
| JP | 8-72312 | 3/1996 |

* cited by examiner

Primary Examiner—Thinh Nguyen
(74) Attorney, Agent, or Firm—Morgan, Lewis & Bockius LLP

(57) ABSTRACT

Of a band border portion which is an area where a black stripe might occur, in an area near a band border portion adjacent to an unrecorded area, recording density is reduced only when the recording density is high. Since recording density in any unnecessary area is not reduced, no white stripe is produced, either. It is therefore possible to obtain an image having no banding.

22 Claims, 10 Drawing Sheets

FIG.4
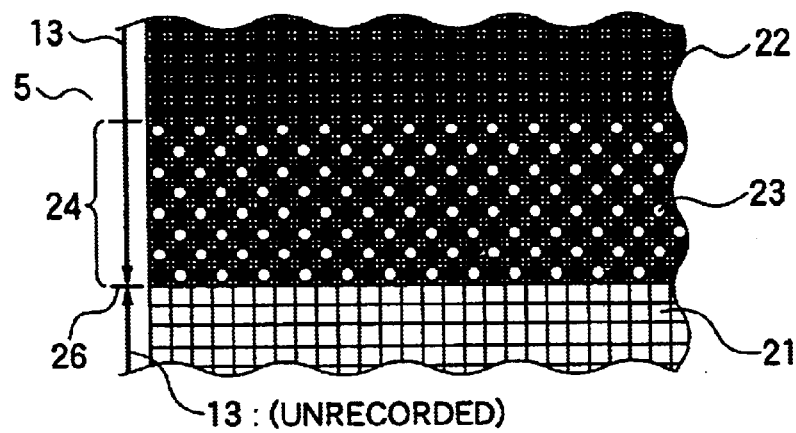
13 : (UNRECORDED)
FIG.5
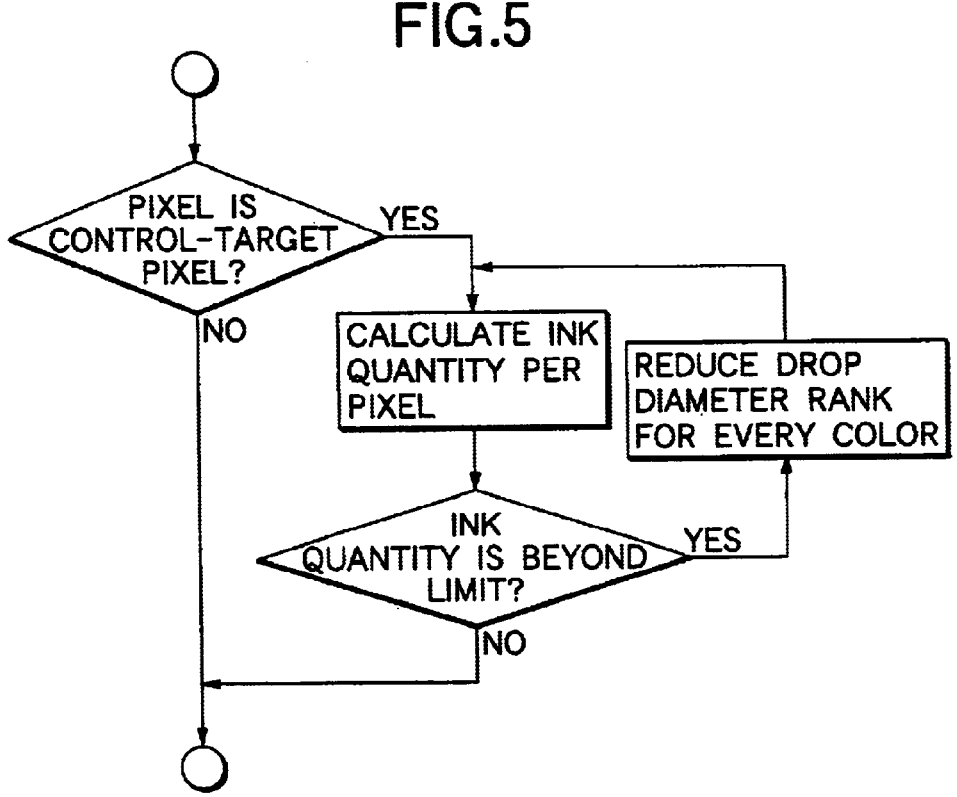
FIG.6

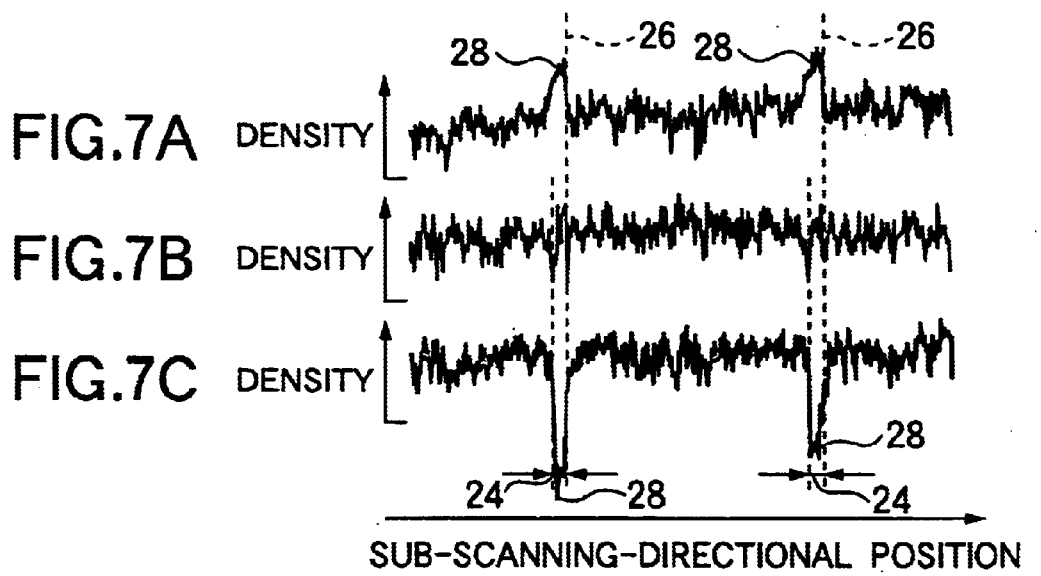
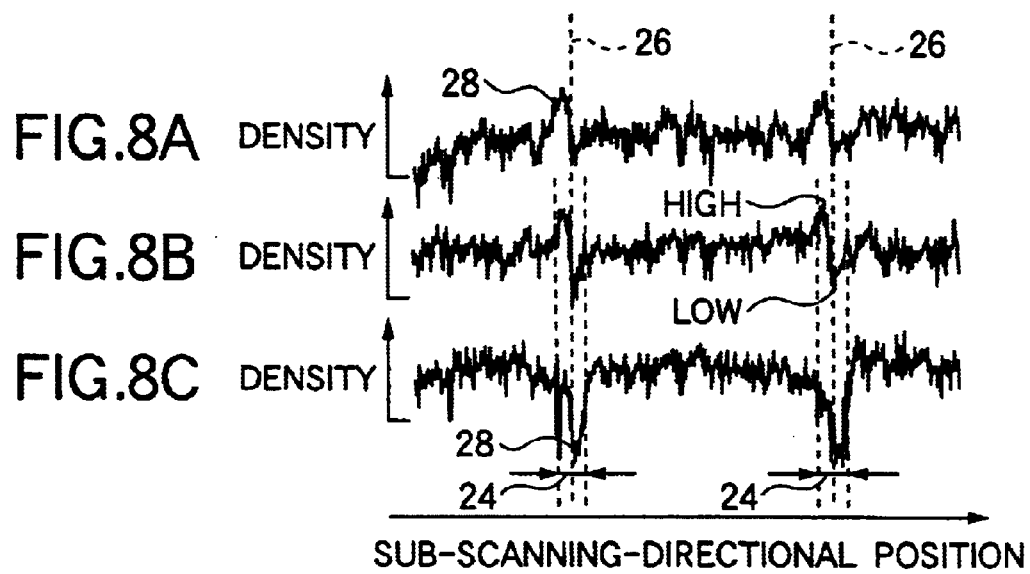

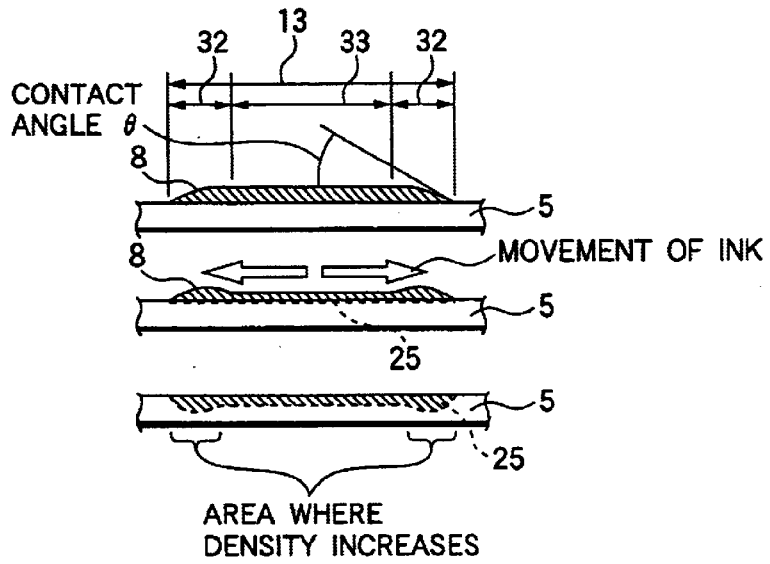
FIG.9A
FIG.9B
FIG.9C
AREA WHERE
DENSITY INCREASES
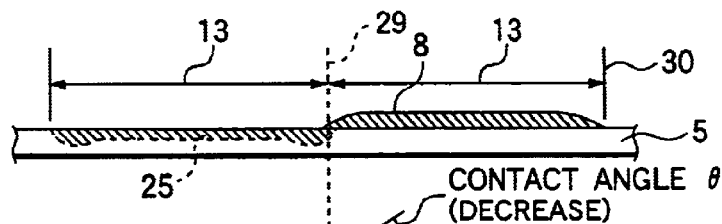
FIG.10A
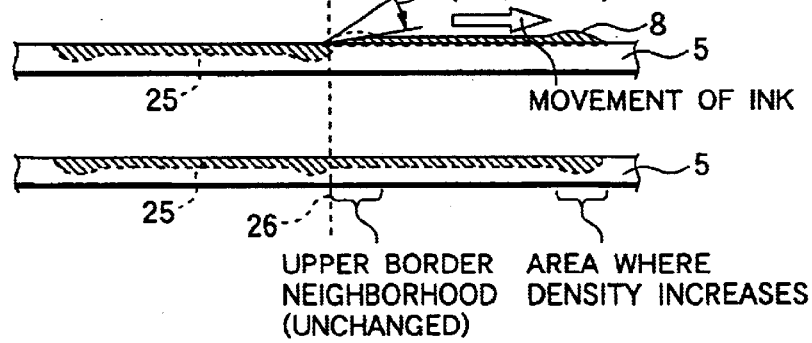
FIG.10B
FIG.10C
UPPER BORDER　　AREA WHERE
NEIGHBORHOOD　DENSITY INCREASES
(UNCHANGED)

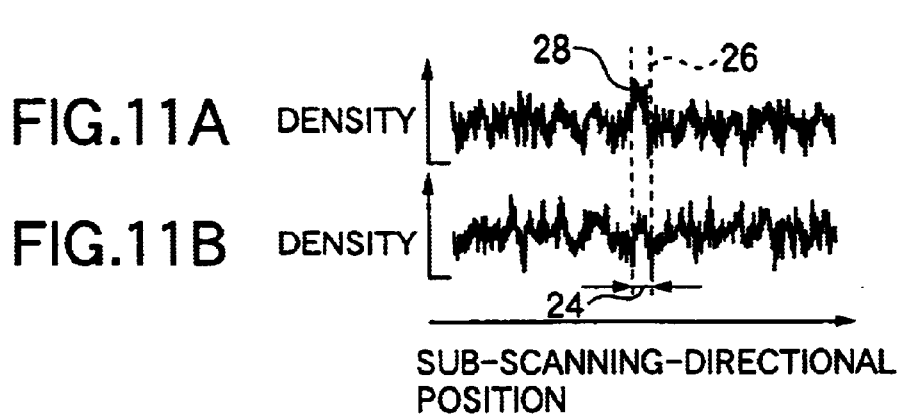
FIG.11A
FIG.11B
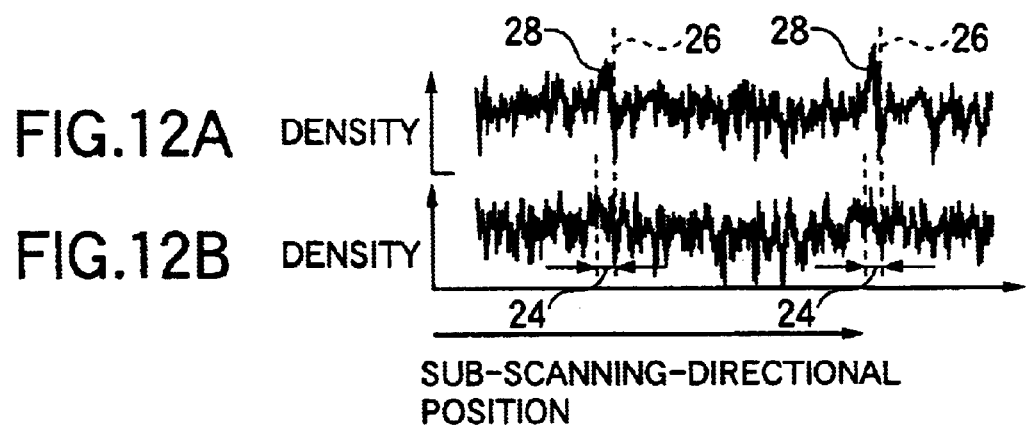
FIG.12A
FIG.12B
FIG.13
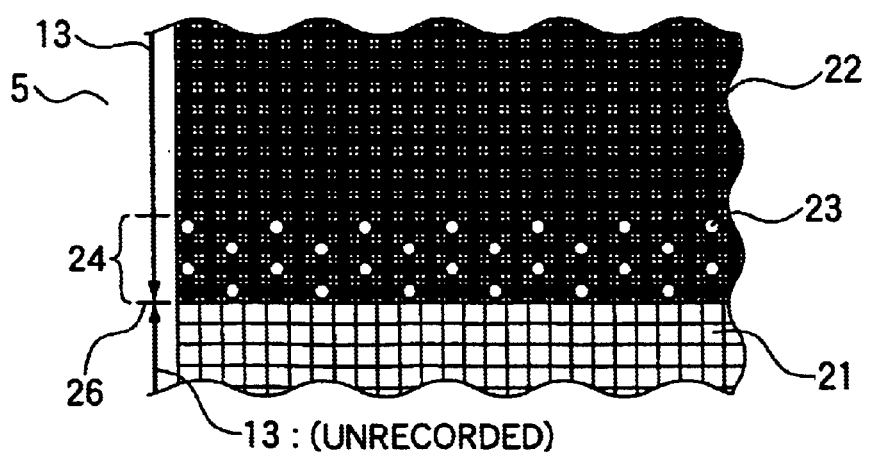

FIG.14
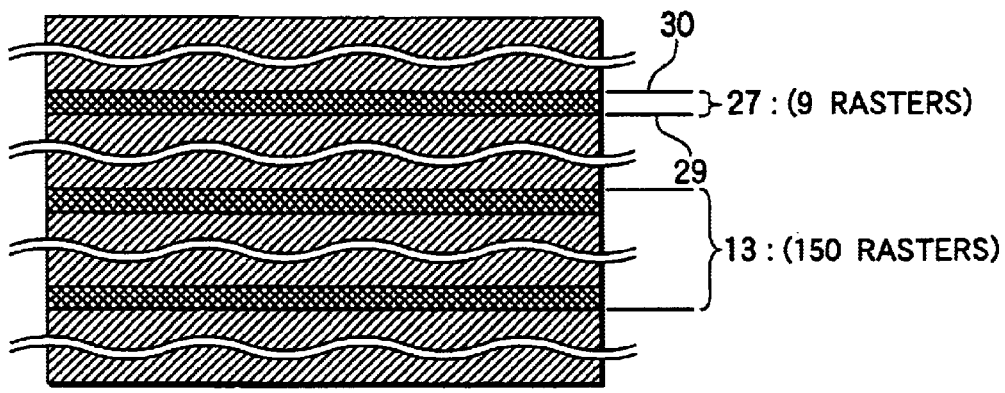
FIG.15A DENSITY
FIG.15B DENSITY
FIG.15C DENSITY
SUB-SCANNING-DIRECTIONAL POSITION
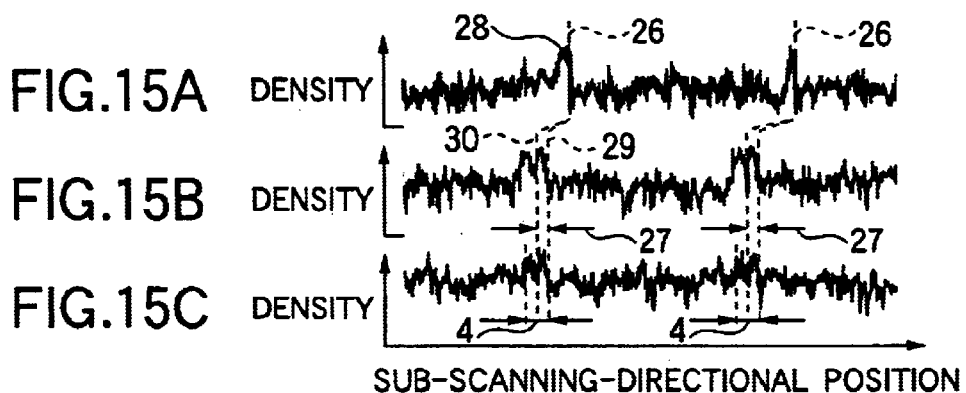
FIG.16A DENSITY
FIG.16B DENSITY
SUB-SCANNING-DIRECTIONAL POSITION
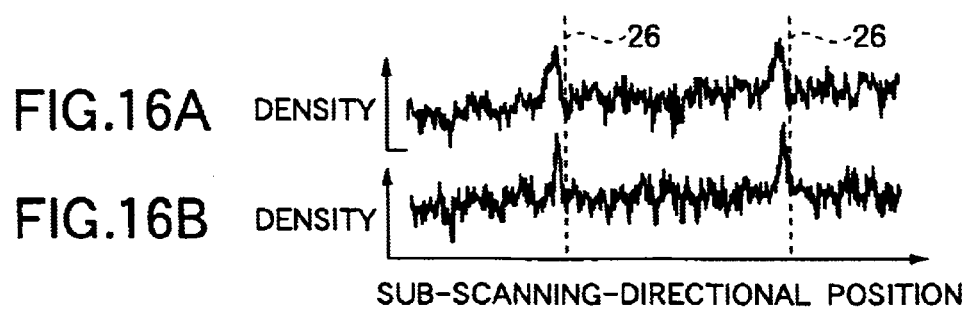

FIG. 17
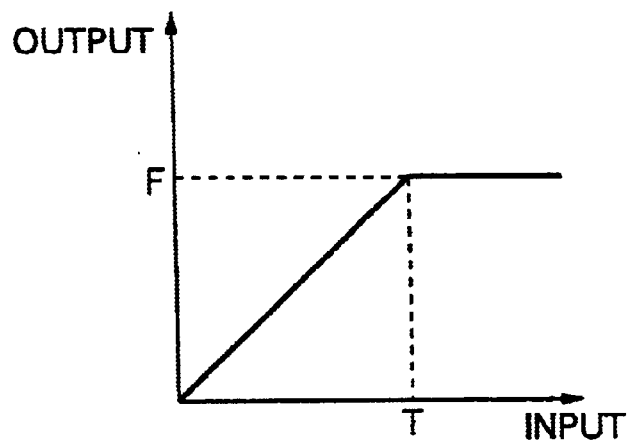
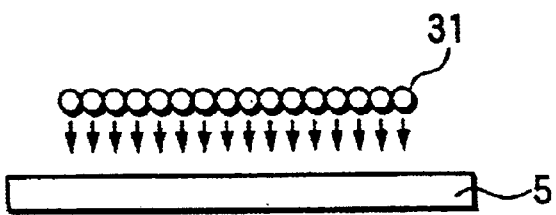
FIG. 18A
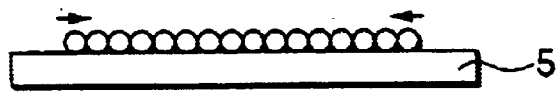
FIG. 18B
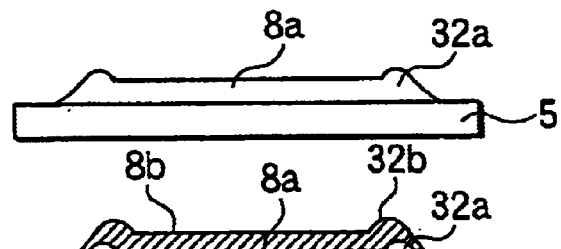
FIG 18C
FIG. 18D
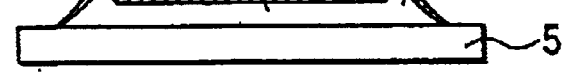
FIG. 18E
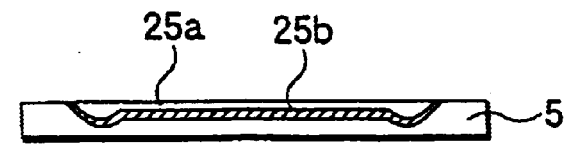

FIG.19
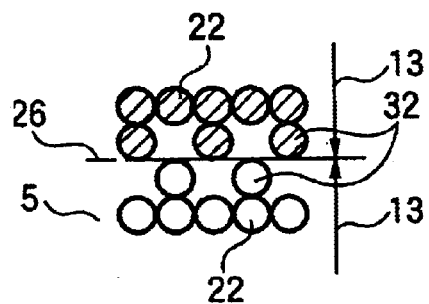
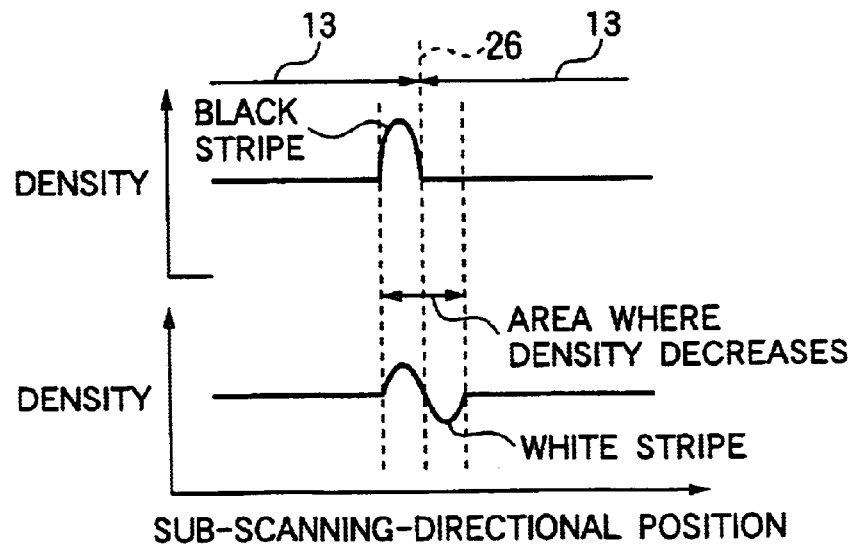

INK JET RECORDING APPARATUS AND INK JET RECORDING METHOD

BACKGROUND OF THE INVENTION

1. Field of the Invention

The present invention relates to an ink jet recording apparatus and an ink jet recording method, and particularly relates to an ink jet recording apparatus and an ink jet recording method for recording a high-quality image without density unevenness.

2. Description of the Related Art

In a recording apparatus in which a recording head having a plurality of recording elements forms an image while carrying out main-scanning and sub-scanning relatively to a recording medium, there is a problem that density unevenness such as white stripes or black stripes extending in the main-scanning direction occurs periodically. The phenomenon that density unevenness occurs is called banding.

In an ink jet recording apparatus, ink is ejected from nozzles which are recording elements, and landed on a recording medium to thereby record pixels. Generally, in the ink jet recording apparatus, ink is ejected at the same time as main-scanning so that recording is carried out by unit of a belt-like area (hereinafter referred to as "band") long in the main-scanning direction. Such bands are lined up in the sub-scanning direction so as to form an image.

Particularly in the ink jet recording apparatus, banding caused by ink bleed is apt to occur, resulting in a problem in deterioration of image quality. Such banding caused by ink bleed occurs in a joint between bands when recording is performed with comparatively high density. The banding caused by ink bleed has a feature in that it appears as a black stripe with high density.

To cope with the banding, there has been proposed a technique in which the density of an image to be recorded is adjusted to prevent high-density stripes from occurring. JP-A-2-3326 discloses a method in which density adjustment is given to end portions of any band bordering adjacent bands. JP-A-2-3326 says that the reason why the density of a joint between bands increases is because the width of each recorded band spreads due to ink bleed. Then, when only a high-density area is selected and the density therein is reduced in accordance with a density correction curve shown in FIG. 17, the density can be prevented from increasing.

Further, JP-A-8-72312 explicates the mechanism causing increase in the density in band end portions, and discloses a method to reduce the density of the band end portions in accordance with the kind of recording medium. According to JP-A-8-72312, the density in the band end portions increases due to the influence of beading. When high-density recording is performed, ink heaps up in the surface of the recording medium immediately after ink drops are landed on the recording medium. At this time, the ink moves to band end portions 32 by the action of the surface tension of ink 8 as shown in FIG. 18. As a result, the density in the band end portions 32 increases.

As the method for adjusting the density in the band end portions, JP-A-64-26460 discloses a method based on forcible thinning out of recording-target pixels 22 as shown in FIG. 19. In this method, the recording-target pixels 22 on both sides of a band boarder 26 are thinned out alternately when they are recorded. As a result, the density in the band end portions 32 is lowered so that the banding becomes inconspicuous.

However, according to-the related-art-method for reducing the density in the band end portions, no sufficient effect to eliminate banding can be obtained because of the problem of the area to be reduced in density.

FIG. 20 is a graph showing the change of density near a band border when the related-art method was applied. The line A in FIG. 20 shows the case where the related-art method was not applied. On the other hand, there occurred a problem that a white stripe appeared additionally when the related-art method was applied (line B in FIG. 20). Because the white stripe appeared additionally thus, it was difficult to eliminate banding perfectly.

SUMMARY OF THE INVENTION

It is therefore an object of the invention to provide an ink jet recording apparatus and an ink jet recording method for performing high-quality recording without banding when the mechanism causing occurrence of banding is explicated, an area having increase in density is specified, and the density in the specified area is adjusted.

An ink jet recording apparatus according to the invention includes a recording head having a plurality of recording elements arrayed for ejecting ink drops including color materials to record recording pixels, a recording element control unit for controlling the ejection of the ink drops from the recording elements, a main-scanning unit for making the recording head relatively main-scan a recording medium in a first direction while the recording head faces to the recording medium, a sub-scanning unit for making the recording head relatively sub-scan the recording medium in a second direction while the recording head faces to the recording medium, and a scanning control unit for controlling the main-scanning unit and the sub-scanning unit. The first and second directions are different from each other. The recording elements are actuated with the main-scanning to record bands in which a longitudinal direction thereof is a main-scanning direction. An image is recorded by repeating the main-scanning and the sub-scanning. The recording element control unit has a recording density control unit for reducing recording density only in an area near a border portion of the bands adjacent to unrecorded areas of border portions of the bands as long as the recording density is high.

The present inventor find that an area where density increase occurs as banding does not center about a band border 26 practically, but is displaced toward one of the bands on either side of the band border 26. The inventor further proves that when recording is carried out with high density, an area where the density increases to produce a black stripe is limited to an area which is a band end portion and in which a band adjacent to the band end portion is unrecorded.

Accordingly, the area to be reduced in recording density by the recording density control unit is limited by a recording element control unit to an area whose adjacent area is unrecorded. Thus, black stripes can be prevented from occurring. In addition, there is no fear that recording density is reduced in any unnecessary area so that an image having no banding and without occurrence of any white stripe can be obtained.

BRIEF DESCRIPTION OF THE DRAWINGS

FIG. 4 is an explanatory view showing a pattern for selecting control-target pixels applied to a first embodiment of the recording apparatus according to the invention.

FIG. 5 is a flow chart showing the control process of the ink fixing quantity applied to the first embodiment of the recording apparatus according to the invention.

FIG. 6 is an explanatory table showing an operating mask for calculating the ink fixing quantity applied to the first embodiment of the recording apparatus according to the invention.

FIG. 7 is a density distribution graph showing the effect obtained when a solid image was recorded according to the first embodiment of the recording apparatus according to the invention.

FIG. 8 is a density distribution graph showing the effect obtained when a solid image was recorded according to the related art.

FIGS. 9A to 9C are explanatory views showing the mechanism causing increase in the density in end portions of a single band.

FIGS. 10A to 10C are explanatory views showing the fact that the density in the upper border neighborhood between bands does not increase when the bands are adjacent to each other.

FIG. 11 is a density distribution graph showing the effect obtained when a half tone image was recorded according to the first embodiment of the recording apparatus according to the invention.

FIG. 12 is a density distribution graph showing the effect obtained according to a third embodiment of the recording apparatus according to the invention.

FIG. 13 is an explanatory view showing a pattern for selecting control-target pixels applied to the third embodiment of the recording apparatus according to the invention.

FIG. 14 is an explanatory view showing the correspondence between recording pixels and bands on a recording medium when shingling is applied in a fourth embodiment of the recording apparatus according to the invention.

FIG. 15 is a density distribution graph showing the effect obtained according to the fourth embodiment of the recording apparatus according to the invention.

FIG. 16 is a density distribution graph showing the effect obtained according to a fifth embodiment of the recording apparatus according to the invention.

FIG. 17 is a graph for explaining a density correction curve in the related art.

FIGS. 18A to 18E are explanatory views showing, within a known extent, the mechanism causing increase in the density in band end portions.

FIG. 19 is an explanatory view showing a pattern for thinning out of recording pixels in the related art.

FIG. 20 is an explanatory view schematically showing the density distribution obtained when the related art is applied.

DETAILED DESCRIPTION OF THE PREFERRED EMBODIMENT

Next, embodiments of the invention will be described in detail with reference to the drawings.

Figure 1:
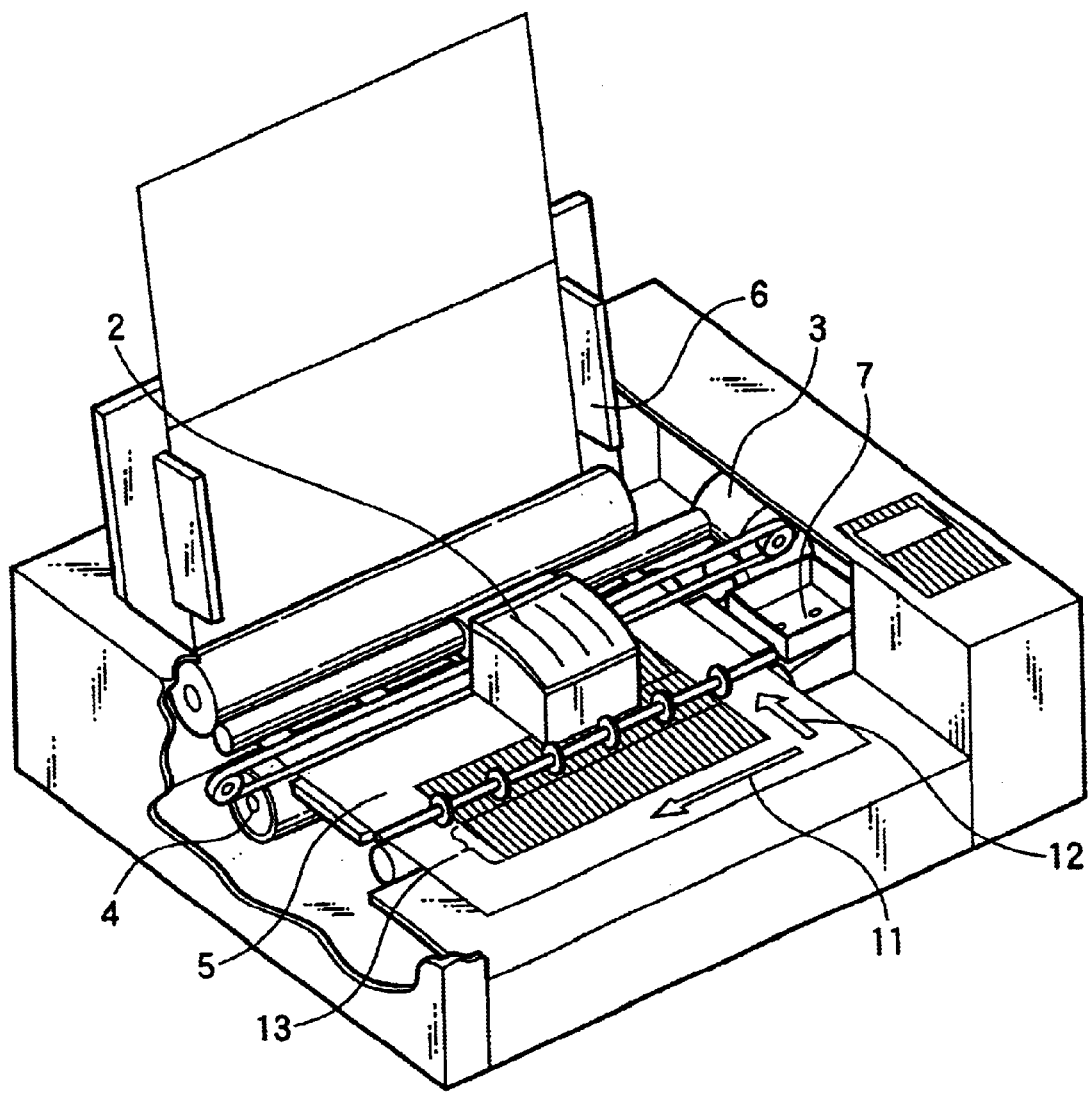
FIG. 1 is a perspective view showing the configuration of a recording apparatus according to the invention.

FIG. 1 shows a serial recording apparatus, which the invention is aimed at. The serial recording apparatus includes a main-scanning mechanism 3, a sub-scanning mechanism 4 operating in a direction perpendicular to the main-scanning mechanism 3, a carriage 2 having a bottom on which a recording head 1 is mounted, and a controller (not shown) for controlling the mechanisms 3 and 4 and the carriage 2. The recording head 1 has a plurality of recording elements 9 arrayed in a sub-scanning direction 12. In such a configuration, the recording elements 9 are driven while main-scanning is performed, so that each belt-like area (band 13) extending in a main-scanning direction 11 is recorded. Successively, sub-scanning is performed with a length equal to the width of the band 13. Then, main-scanning is performed again to record another band 13. The operations are repeated to record a two-dimensional image on a recording medium 5.

Figure 2:
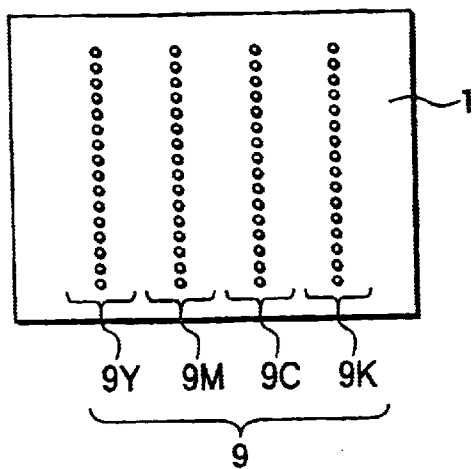
FIG. 2 is a schematic view showing the layout configuration of recording elements of a recording head applied to the recording apparatus according to the invention.

In the recording head 1, as shown in FIG. 2, recording element arrays each having the recording elements 9 arrayed in a line are disposed in parallel correspondingly to the number of colors to be recorded. Incidentally, such disposition is not essential for carrying out the invention, but any other disposition may be adopted if bands 13 are recorded by main-scanning. The recording head 1 is mounted on the carriage 2 so that the recording elements 9 are opposed to the recording medium 5.

Figure 3:
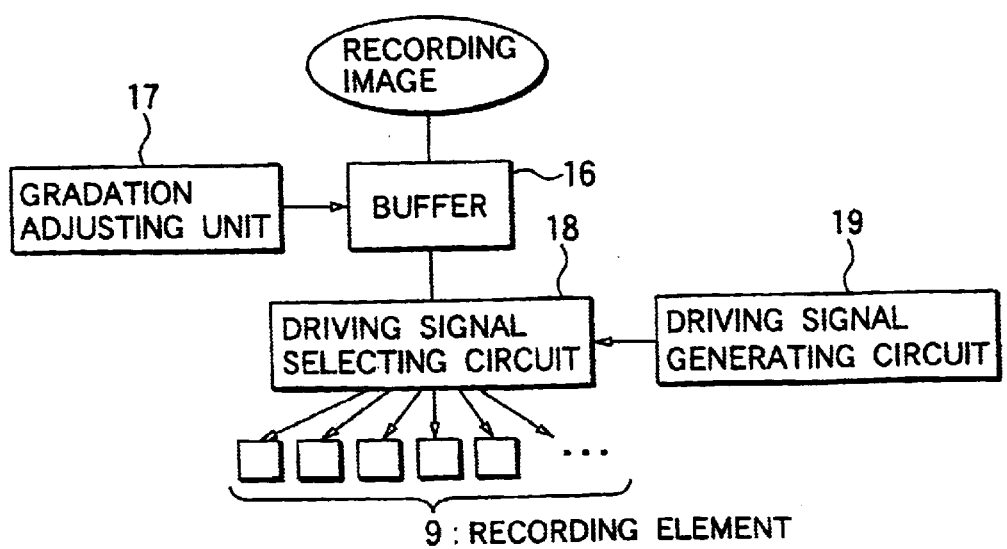
FIG. 3 is a block diagram showing a form of the recording apparatus according to the invention.
Figure 21:
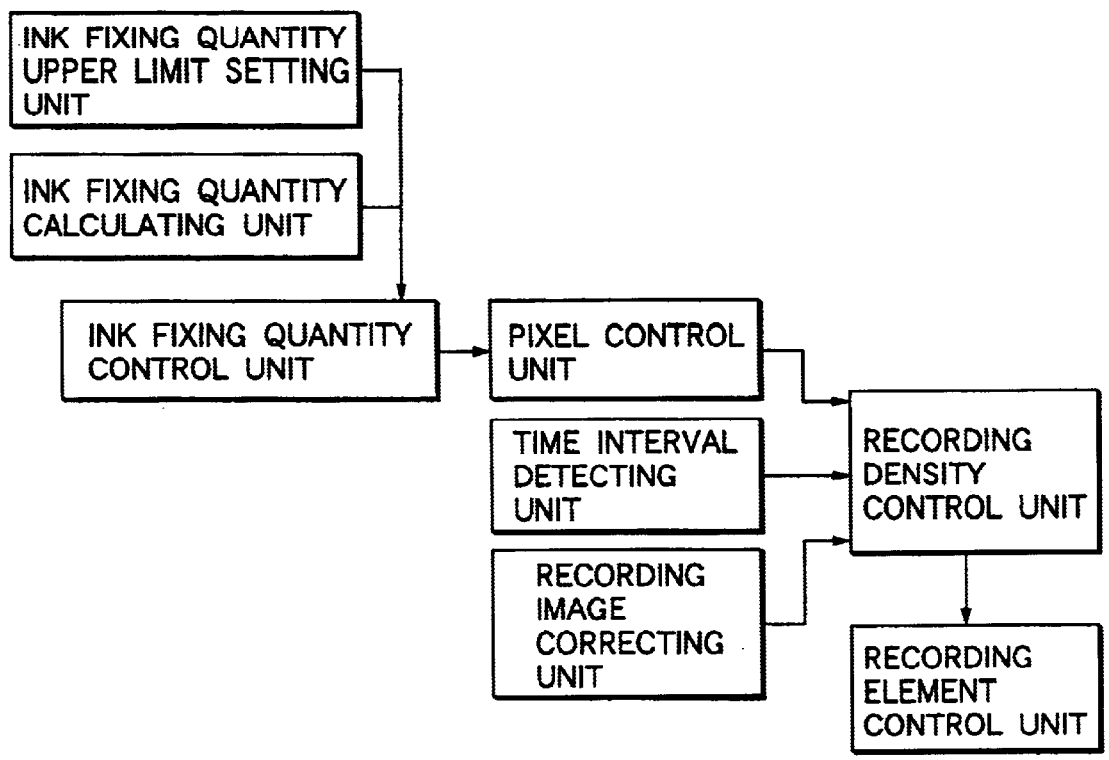
FIG. 21 is a functional block diagram of an ink jet recording apparatus according to the invention.

FIG. 3 is a diagram showing the flow of recording data in the invention. The serial recording apparatus has a buffer 16 for storing recording data for the bands 13. The recording data is fetched sequentially from the buffer 16 during main-scanning, so that a driving signal corresponding to the fetching is generated by a driving signal generating circuit 19 and a driving signal selecting circuit 18. The recording elements 9 are driven by the driving signal so as to record recording pixels 21 and form an image.

A gradation adjusting unit 17 is connected to the buffer 16 so as to adjust the gradation to record the recording pixels 21 on the basis of a method which will be described later.

The recording data set in the buffer 16 may be made up by an external apparatus such as a personal computer, or may be made up by an image converting unit incorporated in the serial recording apparatus. The image converting unit mentioned here has a function of general density conversion or color conversion, half tone processing, and the like, for suiting the recorded image to the device properties of the recording apparatus.

Incidentally, each band 13 has two end portions in its opposite ends in the sub-scanning direction 12. In the following description, the two end portions will be distinguished from each other. That is, the end portion on the side of an adjacent band recorded previously to the band in question will be referred to as an upper border 29 while the end portion on the side of a band to be recorded after the band in question will be referred to as a lower border 30. In addition, as for the volume of each ink drop 31, assume that ink will be expressed by unit of pl (pico-liter=$10^{-15}$ m$^3$). Further, in the following description, a set of recording pixels 21 having the same position in the sub-scanning direction 12 will be referred to as "raster", which will be used as a unit expressing the width of an area in the sub-scanning direction 12.

First Embodiment

Description will be made about the first embodiment. In the first embodiment, the invention is applied to an ink jet recording apparatus in which gradation is expressed by modulating the size of ink drops 31 into three kinds of drop diameter ranks.

A recording head 1 in which four recording element arrays each having 150 recording elements 9 arrayed in a line at an interval of 70.6 μm in the sub-scanning direction 12 are arranged in parallel is used. Cyan, magenta, yellow and black inks 8 are assigned to the recording element arrays, respectively.

The most distinctive feature of the invention is that at a time of high-density recording, only the quantity of the ink 8 fixed (hereinafter referred to as "ink fixing quantity") to an area near the lower border 30 (hereinafter referred to as "lower border neighborhood") is reduced while the ink fixing quantity to an area near the upper border 29 (hereinafter referred to as "upper border neighborhood") is not changed. In the first embodiment, an upper limit is set on the ink fixing quantity per unit recording pixel to the lower border neighborhood. When the ink fixing quantity exceeds the upper limit, the quantity of ink drops is reduced forcibly. Description will be made below in detail.

Eight rasters in the lower border neighborhood shown in FIG. 4 are set as a control-target area 24 for controlling the ink fixing quantity. Further, the recording pixels 21 to be controlled (hereinafter referred to as "control-target pixels 23") are selected like a checkerboard from recording-target pixels 22 subjected to recording in the control-target area 24, so that the ink fixing quantity is controlled over half the recording pixels in the lower border neighborhood.

FIG. 5 shows a flow chart of processing on the recording-target pixels 22. First, judgment is made as to whether each of the recording-target pixels 22 is a control-target pixel 23 or not. When conclusion is made at this time that the recording-target pixel 22 is a control-target pixel 23, the ink fixing quantity per unit recording pixel in the neighborhood thereof is obtained. When the ink fixing quantity is larger than the set upper limit, the drop diameter rank of the ink drops 31 for recording the recording pixel 21 is reduced by one so that the drop quantity of the ink 8 is reduced. At this time, the ink fixing quantity per unit recording pixel is the total sum of all the ink colors. In addition, the same reduction of the drop diameter rank is applied on all of the ink colors with an exception that the reduction of the drop diameter rank is not applied to an ink color having an ink fixing quantity of 0. After the drop diameter rank is reduced, the routine of processing returns to the processing for obtaining the ink fixing quantity per unit recording pixel. Such processing is repeated until the ink fixing quantity reaches the upper limit or lower.

The ink fixing quantity is calculated in consideration of the ink fixing quantity of the recording pixels 21 around the control-target pixels 23. FIG. 6 shows an operating mask used for calculating the ink fixing quantity per unit recording pixel in the neighborhood of a control-target pixel 23. By use of this operating mask, individual ink fixing quantities for the control-target pixel 23 and the recording pixels 21 around the control-target pixel 23 are weighted and summed to obtain the ink fixing quantity.

Incidentally, with the sizes of the three kinds of ink drops 31 set at 13 pl, 26 pl and 39 pl, recording is performed with four gradations including the case where the ink 8 is not fixed. On this occasion, the drop diameter rank is the largest at the time of 39 pl, and the smallest when the ink drops 31 are not fixed. PPC paper is used for the recording medium 5.

The control of the ink fixing quantity is performed on the recording data set in the buffer 16 by the gradation adjusting unit 17. As a result, the banding 28 is improved. FIG. 7 is a graph showing that effect. The density distribution in the sub-scanning direction 12 is measured on the basis of the result in which a solid image formed in cyan and magenta is recorded. It is noted that the density distribution shows the result averaged in the main-scanning direction 11. Here, the solid image is formed by the ink drops 31 of 39 pl, which is maximum density. On this occasion, the ink fixing quantity per unit recording pixel is 78 pl in consideration of the number of ink colors. When the invention is not applied, the recording density is so high in the band end portions 32 that the banding 28 degrade the recording quality conspicuously (the density distribution in FIG. 7A). On the other hand, when the invention is applied, the density distribution becomes flat, and the banding 28 is improved (the density distribution in FIG. 7B). However, when the upper limit of the ink fixing quantity per unit recording pixel is made too low, the band end portions 32 are missed to be too white, still resulting in the banding 28 (the density distribution in FIG. 7C). The optimum upper limit of the ink fixing quantity in this embodiment is 60 pl.

It has been hitherto known that banding 28 is recognized when the density in the band end portions 32 becomes high. As measures against such a phenomenon, processing for reducing the density in the neighborhood of each border is performed as disclosed in JP-A-8-72312.

In JP-A-8-72312, the upper border 29 and the lower border 30 are not particularly distinguished with respect to each band border 26. It is therefore reasonable to consider that the ink fixing quantities in the neighbor areas on the opposite sides of any border are reduced equally. Thus, the inventor carried out an experiment for confirming the effect obtained by limiting the ink fixing quantity in the neighborhood of any border, that is, in both the upper border neighborhood and the lower border neighborhood, in a similar manner to JP-A-8-72312. However, effect as conspicuous as that in the invention could not be obtained.

FIG. 8 shows the results of measurement of the density distribution in the sub-scanning direction 12 with respect to the recording results obtained by this experiment, in the same manner as that in FIG. 7. In FIG. 8, while changing the quantity of reduction of density, FIG. 8A shows a case where the ink fixing quantity was not controlled; FIG. 8B, a case where variation in the density was the smallest; and FIG. 8C, a case where the ink fixing quantity was controlled too greatly. In FIG. 8B where variation in the density was the smallest, a high-density area and a low-density area are adjacent to each other through the band border 26. For this reason, there is no macroscopic variation in density, so that the banding 28 is inconspicuous slightly. However, visible variation in density still remains with the result that the banding 28 occurred. The reason why the banding 28 did not disappear perfectly thus was because the upper neighbor area where no increase in density occurred was also included in the target for controlling the ink fixing quantity.

According to the analysis carried out prior to the implementation of the invention, the border neighborhood where increase in the density occurs is one-sided. That is, the increase of density occurs only in one area with respect to the border between two bands 13.

The mechanism causing increase in the density in the neighborhood of a border of a band 13 at the time of recording the band 13 can be explained by the action of surface tension. The details of the mechanism will be described with reference to FIGS. 9A to 9C on a case where a high-density solid image is recorded as an example. FIG. 9A is a view showing the state immediately after the ink 8 comes into contact with the surface of the recording medium 5. The band end portions 32 differ from the other portion (referred to as "band center portion 33") in the relationship between the free surface of the ink 8 and the recording medium 5 in the neighborhood. In each of the band end portions 32, the free surface of the ink 8 and the recording medium 5 are connected to form a fixed angle. This angle is defined as a contact angle, which is a physical constant determined by the ink 8 and the recording medium 5 and is always constant.

The drying process of the ink 8 after that is shown in FIG. 9B. The volume of the ink 8 decreases due to its evaporation-drying and its permeation-drying into the recording medium 5. That is, the thickness of the ink layer staying on the surface of the recording medium 5 decreases. In the band end portions 32, however, by the action of the surface tension and the force to keep the contact angle, there is a tendency to keep a fixed liquid surface shape. Thus, the thickness of the ink layer staying on the band end portions 32 hardly decreases. The fact that the thickness of the ink layer hardly decreases does not means that drying goes on slowly. As a result of the action of the surface tension and the force to keep the contact angle, a part of the ink 8 moves from the band center portion 33 to the band end portions. Thus, there occurs a difference in ink layer thickness between the band center portion and the band end portions.

Then, as a result of the difference in ink layer thickness between the band center portion 33 and the band end portions, the ink fixing quantities to the band end portions 32 increase relatively and the density in the band end portions 32 increases. Thus, the banding 28 occurs and degrades the recording quality.

The mechanism causing occurrence of the banding 28 in a single band 13 is described above. However, a part of the phenomenon differs in real recording in which a plurality of bands 13 are recorded sequentially.

FIGS. 10A to 10C are views showing the case where a band 13 is recorded in the state that one of adjacent bands thereto has been already recorded. A different point of this case from the case where recording was carried out in a single band 13 is the contact angle in the upper border 29 in the drying process in FIG. 10B. In the upper border 29, the recording medium 5 has been already familiar with the ink 8, so that there is no contact angle or a very small contact angle. For this reason, the contact angle hardly gives any restriction to the liquid surface shape. Thus, the thickness of the ink layer staying on the surface of the recording medium 5 becomes equal to the band center portion 33. On the other hand, in the lower border 30, the ink layer staying on the surface of the recording medium 5 becomes thick relatively in the same manner as that in the case where recording is carried out in a single band 13. As a result, when a plurality of bands 13 are recorded sequentially and adjacently to one another, recording density increases relatively only in the lower border neighborhood of each band 13.

Therefore, in order to perform optimum density correction and prevent the banding 28, the area to be reduced in ink fixing quantity has to be limited only to the lower border neighborhood.

Further, in turn, an image to be recorded was changed from the solid image to a half tone image, and the image to be recorded was recorded with ink drops 31 different in size. The prepared image to be recorded was constituted by recording pixels to be recorded with ink drops of 39 pl and recording pixels to be recorded with ink drops of 26 pl by half tone processing. In addition, the number of the former recording pixels was substantially equal to the number of the latter recording pixels, and these two kinds of recording pixels were distributed like error diffusion. Also in such conditions, the banding 28 was improved by the operation with the upper limit of the ink fixing quantity set at 60 pl as described above. FIG. 11 shows the result of improvement.

In the density distribution of FIG. 11A where the control of the ink fixing quantity was not applied, the increase of density showing the banding 28 is observed in the lower border neighborhood. However, in the density distribution of FIG. 11B where the ink fixing quantity was controlled, the increase of density is canceled.

Thus, it is proved that the invention having an effect not only on a solid image but also on a half tone image. Since half tone images are used broadly in an ink jet recording apparatus, it can be said that the invention is generally applicable to an ink jet recording apparatus.

Second Embodiment

The first embodiment is aimed at a recorded image of secondary color in which two colors of cyan and magenta are mixed. In the second embodiment, the invention is applied to a recorded image of tertiary color in which yellow is further added. A so-called process-black solid image, which is a solid image using ink drops 31 of 39 pl for each of the three colors of cyan, magenta and yellow, is used to perform recording with maximum density.

In the second embodiment in which tertiary color is aimed at, the ink fixing quantity per unit recording pixel is increased to 1.5 times as large as that in the case where secondary color is aimed at. Thus, the banding 28 may be more conspicuous. As a result of evaluation by recording experiments, the effect to reduce the banding 28 according to the invention is recognized also in the case where tertiary color is used and the ink fixing quantity is increased. Incidentally, the upper limit of the ink fixing quantity set at that time is 90 pl, which is a value larger than that in the case for secondary color.

In such a manner, the invention is effective also in the case of a large ink fixing quantity, for example, in the case of tertiary color represented by process black.

Third Embodiment

In the embodiments described so far, description is made on the effect of the invention on the conspicuous banding 28 occurring when the ink drops 31 of 39 pl are used to obtain the maximum density. Banding 28 occurs, though to a small degree, in a lower-density solid image using ink drops 31 of 26 pl. Description will be made on measures against such a case. Incidentally, secondary color is aimed at here, and two colors of cyan and magenta are adopted in a similar manner to the first embodiment.

The density distribution of FIG. 12A shows the place where banding 28 occurs. When the ink fixing quantity is comparatively small, the width of the area having increase in density in the lower border neighborhood becomes narrow. Therefore, the width of the area where ink fixing quantity is controlled is required to be narrowed in accordance with the width of the area having increase in density. Here, the area where ink fixing quantity is controlled is set up to 4 rasters from the lower border 30 of each band 13.

In addition, the quantity of increase of density is smaller than that when the ink drops 31 of 39 pl are used. It is therefore desired to make a finer control with respect to reduction of the ink fixing quantity. On the other hand, in the smaller number of gradations per recording pixel unit, for example, in four gradations, the roughness of resolving power of controlling the ink fixing quantity becomes a problem. Due to the roughness of resolving power, the control of the ink fixing quantity becomes so excessive that the density is made too low. Therefore, the ratio of the control-target pixels 23 in the control-target area 24 is reduced to ¼. Thus, the range of the quantity of reduction of density is narrowed to enhance the resolving power of controlling the ink fixing quantity. FIG. 13 shows a pattern for selecting the control-target pixels 23.

Thus, by changing the width of the controlled area and the pattern of the recording pixels 21, the density can be prevented from increasing, so that the banding 28 can be eliminated (the density distribution of FIG. 12B). Incidentally, the upper limit of the ink fixing quantity at that time is 55 pl. In such a manner, the invention is effective also on the area where the recording density is comparatively low, and the banding 28 is slight.

Fourth Embodiment

Shingling is known as a technique for improving the recording quality of a serial recording apparatus. Shingling is a technique of recording as follows. That is, a plurality of bands 13 are made to overlap one another, and of the bands 13, some are selected for recording by recording pixel unit. When one raster is recorded by a plurality of recording elements 9, the tendency of scattering in errors of fixing positions of the ink drops 31 or in size of the ink drops 31 in each raster can be prevented from being regular. Thus, such a tendency can be made inconspicuous. Shingling is effective in the banding 28 caused by the scattering of the recording elements 9 or the accuracy of sub-scanning.

In the fourth embodiment, shingling is introduced into the invention so as to improve the problem of the image quality caused by the low accuracy of sub-scanning. FIG. 14 is a view showing the correspondence between the recording pixels 21 and the bands 13 on the recording medium. Adjacent bands 13 overlap each other by 9 rasters. This overlapping area is referred to as a "shingling area 27". To record the recording pixels 21 in the shingling area 27, a format in which the adjacent bands 13 replaced each other like comb-teeth in the main-scanning direction 11 is adopted so that any recording pixel 21 is prevented from being recorded repeatedly by both the bands 13. Incidentally, the number of rasters in the shingling area 27 or the format as to which band 13 is allocated to which recording pixels 21 is not limited thereto, but can be set desirably in accordance with the degree of the banding 28.

In a border between bands 13, there is a shingling area 27 to be recorded by both the bands 13. Therefore, the upper border 29 and the lower border 30 are set in the borders with respect to the shingling area 27, respectively. Thus, the shingling area 27 is excluded from the upper border neighborhood and the lower border neighborhood.

The density distribution in FIG. 15B shows the density distribution when secondary color of cyan and magenta is recorded with maximum density only by shingling without controlling the ink fixing quantity. In comparison with the density distribution in FIG. 15A in which shingling is not carried out, it is proved that the increase of density in the border is reduced a little, but the increase of density still appears. The period with which the increase of density appears is shorter in the case where shingling is performed. This is because the substantial number of nozzles is reduced by shingling so that the width of the bands 13, that is, the repetitive period of the bands 13 is reduced.

Also when shingling is applied, the area where the increase of density occurs is likewise in the lower border neighborhood of each band 13. For details, it is proved from the density distribution in FIG. 15B that the increase of density occurring near the border between bands 13 appears in the lower border neighborhood and the singling area 27.

Then, the ink fixing quantity is controlled on both the lower border neighborhood and the shingling area 27, with the result that the density distribution can be made flat (the density distribution in FIG. 15C). The upper limit of the ink fixing quantity at that time is 65 pl for the lower border neighborhood and 70 pl for the shingling area 27. The control of the ink fixing quantity is applied to half the recording pixels 21 in the area where ink fixing quantity is controlled, in the same manner as in the first embodiment.

In such a manner, even when shingling is used together, the increase of density can be suppressed by the control of the ink fixing quantity. The area where ink fixing quantity is controlled at this time corresponds to the lower border neighborhood and the shingling area 27. The two areas have different mechanisms causing increase in the density.

In the lower border neighborhood, the increase of density occurs due to the action of the surface tension and the action of the contact angle on the principle described previously with reference to FIGS. 10A to 10C. It is a different point from FIGS. 10A to 10C that the shingling area 27 exists outside the lower border neighborhood. In the shingling area 27, half the recording pixels 21 are thinned out so that the ink fixing quantity is small. Thus, drying is so quick that the surface tension hardly acts. Then, the contact angle between the ink 8 on the recording medium 5 and the recording medium 5 is formed substantially on the lower border 30 excluding the shingling area 27. Therefore, the ink 8 is collected only in the lower border neighborhood.

In the shingling area 27, the ink fixing quantity in main-scanning at one time is so small that the ink 8 dries easily in the surface layer of the recording medium 5. On the contrary, in the non-shingling area, the ink fixing quantity is so large that the ink 8 makes an intrusion from the surface layer of the recording medium 5 into a deeper layer thereof easily. The ink 8 intruding into the deeper layer has a small contribution to coloring. Thus, when both the bands 13 are recorded so that the shingling area 27 is recorded completely, the density of the shingling area 27 increases relatively.

In such a manner, the lower border neighborhood and the shingling area 27 have different mechanisms causing increase in the density. Accordingly, optimum control of density is performed for each of the lower border neighborhood and the shingling area 27 so that the banding 28 can be prevented.

Fifth Embodiment

In the fifth embodiment, the increase of density is suppressed with a varying time interval with which adjacent bands 13 have to be recorded.

According to experiments of the inventor, the way of increase in the density in the band end portions 32 varies in accordance with the time interval until a band adjacent thereto is recorded. FIG. 16 is a graph showing the influence of the difference in time interval on the increase of density. In comparison with the density distribution in FIG. 16A having a short time interval, the density distribution in FIG. 16B having a long time interval showed a narrow area where the density increases, and a great degree of increase.

Such a difference is caused by the fact that the ink 8 moves to the band end portions 32 at a low speed. As described previously, the movement of the ink 8 results in the increase of density. The movement of the ink 8 continues till the ink 8 itself is evaporated or till an adjacent band is recorded so that the border between the recording medium 5 and the free surface of the ink 8 disappears. When the time interval until the adjacent band is recorded is short, the movement of the ink 8 to the band end portions 32 is aborted early so that the concentration in the band end portions gets weak, resulting in such a difference.

Against such change in the way of increase in the density, the width of the area where ink fixing quantity is controlled, the pattern of the recording pixels 21 to be controlled, and the upper limit of the ink fixing quantity are optimized. The time interval until an adjacent band is recorded is measured. When the interval is elongated, the area where ink fixing quantity is controlled is narrowed, and the upper limit of the ink fixing quantity is reduced. In such a manner, the banding 28 could be eliminated effectively.

Incidentally, the time interval until an adjacent band is recorded varies in accordance with the scanning distance of main-scanning. Generally, the scanning distance of main-scanning is optimized for data to be recorded. Thus, the scanning distance of main-scanning fluctuates. In addition, data processing or data transfer may be a bottleneck, for which the recording operation is put off. Of course, when the speed of main-scanning is changed, the speed becomes a factor having an influence on the time interval.

Sixth Embodiment

A serial recording apparatus for recording with four gradations per recording pixel unit is described so far by way of example. However, the invention is applicable not only to a serial recording apparatus for multi-gradation recording such as four-gradation recording but also a general serial recording apparatus for two-gradation recording.

In the case of two-gradation recording, it is necessary to pay attention to the controlled ink fixing quantity. Since the number of gradations per recording pixel unit is small to be 2, there is a high possibility that the ink fixing quantity is controlled excessively in comparison with recording with a larger number of gradations per recording pixel unit. In the two-gradation recording, the ink fixing quantity always takes 0 when the ink fixing quantity is controlled.

Accordingly, in the two-gradation recording, the ratio of the control-target pixels 23 is set to be lower than that in the four-gradation recording. Here, the recording pixels 21 to be controlled are set by the pattern shown in FIG. 13 in the same manner as in the third embodiment, while ¼ of the recording pixels 21 in the controlled area are set as the control-target pixels 23. In addition, the upper limit of the ink fixing quantity is set at 80 pl.

In such conditions, a solid image of secondary color of cyan and magenta using the ink drops 31 of 39 pl is recorded with maximum density. As a result, the banding 28 can be prevented from occurring in the border portions of the bands 13.

Seventh Embodiment

The embodiments described so far showed examples in which the gradation per recording pixel unit is controlled by the gradation adjusting unit 17 connected to the buffer 16 so that the banding 28 is eliminated. The invention can be also carried out by controlling the gradation on a recorded image before it is transferred to the buffer 16.

The recorded image to be transferred to the buffer 16 is made up by giving density conversion or color conversion to its original recorded image, and further applying a half tone thereto. Thus, the recorded image is suited to the device properties of the ink jet recording apparatus. In such a conversion process, the recording image exists in the form of high-gradation data with each color in 256 gradations before the half tone is applied.

Therefore, in the recorded image immediately before the half tone is applied, the control of density according to the related art shown in FIG. 17 is carried out on data in the area corresponding to the control-target area 24 in the lower border neighborhood. After that, the recorded image is subjected to the half tone processing, and then transferred to the buffer 16. Thus, recording is performed without operating the gradation adjusting unit 17.

Also by the control of density on such a recorded image, the ink fixing quantity in the lower border neighborhood can be reduced so that the banding 28 can be made inconspicuous.

Incidentally, the operating mask of the ink fixing quantity or the pattern for selecting the control-target area 24 is not restricted to the features shown in the embodiments. The effect of the invention can be obtained satisfactorily by any other operating mask or any other selection pattern.

In addition, the control of the ink fixing quantity or the density in the lower border neighborhood was carried out as described above. However, the control of the ink fixing quantity or the density in the neighborhood of the main-scanning-direction border of each band can be carried out because its adjacent area is unrecorded.

As has been described above, according to the invention, the recording density in a high-density recorded area near the border of each band is reduced in accordance with the recording density only when an unrecorded area is adjacent to the band. Since the place where a black stripe occurs coincides with the area to be reduced in recording density, the black strip which might appear in the band border at the time of high density recording can be eliminated perfectly. Thus, a high-quality recorded image without any banding can be obtained.

What is claimed is:

1. An ink jet recording apparatus comprising:
   a recording head having a plurality of recording elements arrayed for ejecting ink drops including color materials to record recording pixels;
   a recording element control unit for controlling the ejection of the ink drops from the recording elements;
   a main-scanning unit for making the recording head relatively main-scan a recording medium in a first direction while the recording head faces to the recording medium;
   a sub-scanning unit for making the recording head relatively sub-scan the recording medium in a second direction while the recording head faces to the recording medium; and
   a scanning control unit for controlling the main-scanning unit and the sub-scanning unit;
   wherein the first and second directions are different from each other;
   wherein the recording elements are actuated with the main-scanning to record bands in which a longitudinal direction thereof is a main-scanning direction; and
   wherein an image is recorded by repeating the main-scanning and the sub-scanning; and
   wherein the recording element control unit has a recording density control unit for reducing recording density only in an area near a border portion of the bands adjacent to an unrecorded area as long as the recording density is high.

2. The ink jet recording apparatus according to claim 1, wherein the recording density control unit can vary a size of the area to be reduced in recording density.

3. The ink jet recording apparatus according to claim 2, wherein the recording density control unit narrows the size of the area to be reduced in recording density in proportion to lowness of the recording density.

4. The ink jet recording apparatus according to claim 1, wherein the recording density control unit has a pixel control unit for reducing quantities of the color materials recording the recording pixels.

5. The ink jet recording apparatus according to claim 4, wherein the pixel control unit selects a part of the recording pixels included in the area to be reduced in recording density, and reduces recording density of the selected recording pixels.

6. The ink jet recording apparatus according to claim 5, wherein the pixel control unit varies a ratio of the selected part of the recording pixels included in the area to be reduced in recording density, in accordance with the recording density.

7. The ink jet recording apparatus according to claim 4, wherein the pixel control unit includes:
an ink fixing quantity calculating unit for calculating an ink fixing quantity near the recording pixels;
an ink fixing quantity upper-limit setting unit for setting an allowable value of the ink fixing quantity; and
an ink fixing quantity control unit for reducing the ink fixing quantity when the ink fixing quantity exceeds the allowable value of the ink fixing quantity.

8. The ink jet recording apparatus according to claim 7, wherein the ink fixing quantity upper-limit setting unit varies the allowable value of the ink fixing quantity in accordance with the recording density.

9. The ink jet recording apparatus according to claim 1, wherein the recording density control unit includes a recorded image correcting unit for reducing a density gradation of the recorded image.

10. The ink jet recording apparatus according to claim 1,
wherein the recording density control unit includes a time interval detecting unit for detecting a time interval to record the bands repeatedly; and
wherein at least one of the size of the area to be reduced in recording density and a quantity of reduction of the recording density are varied in accordance with the time interval.

11. The ink jet recording apparatus according to claim 1, further comprising:
a shingling control unit for recording the bands to overlap each other; and
a second recording density control unit for reducing the recording density in a shingling area in which the bands overlap each other.

12. An ink jet recording method comprising the steps of:
ejecting ink drops including color materials to record recording pixels;
lining up bands in which a longitudinal direction thereof is a main-scanning direction to form an image while performing main-scanning and sub-scanning in different directions relative to a recording medium; and
reducing recording density only in an area near border portions of the bands adjacent to unrecorded areas of border portions of the bands as long as the recording density is high.

13. The ink jet recording method according to claim 12, wherein a size of the area near the border portions of the bands to which the step of reducing the recording density is applied is variable.

14. The ink jet recording method according to claim 13, wherein in the step of reducing the recording density, the size of the area to be reduced in recording density is narrowed in proportion to lowness of the recording density.

15. The ink jet recording method according to claim 12, wherein in the step of reducing the recording density, quantities of the color materials for recording the recording pixels is reduced.

16. The ink jet recording method according to claim 15,
wherein in the step of reducing the recording density, a part of the recording pixels included in the area to be reduced in recording density is selected; and
wherein in the step of reducing the recording density, the recording density of the selected recording pixels is reduced.

17. The ink jet recording method according to claim 16, wherein in the step of reducing the recording density, a ratio of the selected part of the recording pixels included in the area to be reduced in recording density is varied in accordance with the recording density.

18. The ink jet recording method according to claim 15, wherein the step of reducing the recording density including the steps of:
calculating an ink fixing quantity near the recording pixels;
setting an allowable value of the ink fixing quantity; and
reducing the ink fixing quantity when the ink fixing quantity exceeds the allowable value of the ink fixing quantity.

19. The ink jet recording method according to claim 18, wherein in the step of setting the allowable value of the ink fixing quantity, the allowable value of the ink fixing quantity is varied in accordance with the recording density.

20. The ink jet recording method according to claim 12, wherein in the step of reducing the recording density, a density gradation of the recorded image is reduced.

21. The ink jet recording method according to claim 12, wherein in the step of reducing the recording density, at least one of the size of the area to be reduced in recording density and a quantity of reduction of the recording density is varied in accordance with a time interval to record the bands repeatedly.

22. The ink jet recording method according to claim 12, further comprising the step of:
recording the bands to overlap each other; and
reducing the recording density in an area in which the bands overlap each other.

* * * * *